(12) United States Patent
Cha

(10) Patent No.: US 11,143,296 B2
(45) Date of Patent: Oct. 12, 2021

(54) AUTOMOTIVE TRANSMISSION

(71) Applicant: SL Corporation, Daegu (KR)

(72) Inventor: Hongjun Cha, Daegu (KR)

(73) Assignee: SL Corporation, Daegu (KR)

( * ) Notice: Subject to any disclaimer, the term of this patent is extended or adjusted under 35 U.S.C. 154(b) by 259 days.

(21) Appl. No.: 16/506,580

(22) Filed: Jul. 9, 2019

(65) Prior Publication Data

US 2020/0096100 A1 Mar. 26, 2020

(30) Foreign Application Priority Data

Sep. 21, 2018 (KR) .......................... 10-2018-0114024

(51) Int. Cl.
*F16H 61/22* (2006.01)
*F16H 59/10* (2006.01)
*F16H 1/32* (2006.01)

(52) U.S. Cl.
CPC .............. *F16H 61/22* (2013.01); *F16H 59/10* (2013.01); *F16H 1/32* (2013.01)

(58) Field of Classification Search
CPC ... F16H 2059/0282; F16H 61/22; F16H 59/10
See application file for complete search history.

(56) References Cited

U.S. PATENT DOCUMENTS

2019/0211916 A1 * 7/2019 Morimura ........... F16H 59/0204

* cited by examiner

*Primary Examiner* — Randell J Krug
(74) *Attorney, Agent, or Firm* — Nelson Mullins Riley & Scarborough LLP; Kongsik Kim, Esq.

(57) ABSTRACT

An automotive transmission capable of preventing a lever from unintentionally rotating from one position to another position is provided. The automotive transmission includes a lever assembly including a lever which rotates between a plurality of positions about a rotational axis thereof to select one of a plurality of gear stages; a plurality of locking parts rotating integrally with the lever and disposed at different locations in a direction of the rotational axis of the lever to be spaced apart by a predetermined distance in a direction of rotation of the lever and thus to block the rotation of the lever in at least one direction about the rotational axis of the lever; and a moving part moving in the direction of the rotational axis of the lever to allow one side thereof to be placed on at least one of paths of rotation of the plurality of locking parts.

8 Claims, 13 Drawing Sheets

AUTOMOTIVE TRANSMISSION

CROSS-REFERENCE TO RELATED APPLICATION

This application claims priority from Korean Patent Application No. 10-2018-0114024, filed on Sep. 21, 2018, in the Korean Intellectual Property Office, the disclosure of which is incorporated herein by reference in its entirety.

BACKGROUND

1. Technical Field

The present disclosure relates to an automotive transmission, and more particularly, to an automotive transmission capable of preventing a lever from unintentionally rotating from one position to another position.

2. Description of the Related Art

In general, a transmission may have different gear ratios to constantly maintain the rotational speed of an engine based on the speed of a vehicle, and the driver of the vehicle may adjust the gear ratio of the transmission by operating the gear shift lever.

The shift mode of the transmission may be classified into a manual shift mode in which the driver manually adjusts the gear ratio of the transmission and an automatic shift mode in which the gear ratio of the transmission is automatically adjusted based on the speed of the vehicle when the driver selects the Drive (D) position.

Further, there has been used a sports mode-type transmission capable of implementing both a manual shift operation and an automatic shift operation in a single transmission. In the sports mode-type transmission, a transmission capable of performing the manual shift operation is disposed in addition to a transmission that performs the automatic shift operation to allow the driver to perform the manual shift operation by increasing or decreasing the gear stages, while performing the automatic shift operation.

These and other transmissions are generally equipped with a shift lock function that enables the gear shift lever to rotate from one position to another position only if predetermined conditions are met. The shift lock function basically includes a primary shift lock function that prevents the gear shift lever from rotating from the Park (P) position or the Neutral (N) position to another position unless the brake pedal is depressed and a secondary shift lock function that prevents the gear shift lever from rotating to the Reverse (R) position when the vehicle travels at a predetermined speed or higher. In addition, there has been implemented a full shift lock function capable of enabling shift lock in all gear stages to effectively prevent driver's inadvertent operation.

The gear shift lever is positioned to protrude to the inside of the vehicle to allow the driver's shift operation to be easily performed. However, if the gear shift lever is disposed to protrude at all times in the vehicle even when the vehicle is not operated, the internal space of the vehicle cannot be efficiently utilized. Thus, when the vehicle is not operated, the gear shift lever may be stowed in a predetermined storage space to improve the efficiency of the use of the internal space of the vehicle.

However, since the shift lock function is implemented in connection with each gear stage that may be selected by the gear shift lever, the gear shift lever may unintentionally rotate to be received in the storage space due to driver's inadvertent operation, and as a result, the risk of an accident may increase.

Therefore, a method is needed not only to provide the shift lock function for all gear stages, but also to enable or prevent the rotation of the gear shift lever as necessary to prevent the gear shift lever from unintentionally rotating to be received in the storage space due to driver's inadvertent operation.

SUMMARY

Embodiments of the present disclosure provide an automotive transmission capable of blocking the rotation of a lever between positions that correspond to a plurality of gear stages to allow the lever to rotate only when shift conditions are met. Embodiments of the present disclosure also provide an automotive transmission capable of enabling or preventing the rotation of a lever from a Park (P) position to a stow position. However, exemplary embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to an exemplary embodiment of the present disclosure, an automotive transmission may include a lever assembly including a lever which rotates between a plurality of positions about a rotational axis thereof to select one of a plurality of gear stages; a plurality of locking parts that rotate integrally with the lever and disposed at different locations in a direction of the rotational axis of the lever to be spaced apart by a predetermined distance in a direction of rotation of the lever and thus to block the rotation of the lever in at least one direction about the rotational axis of the lever; and a moving part that moves in the direction of the rotational axis of the lever to allow one side thereof to be placed on at least one of paths of rotation of the plurality of locking parts.

According to the above and other embodiments of the present disclosure, the rotation of a lever may be blocked to allow the lever to rotate between positions that correspond to a plurality of gear stages only when shift conditions are met, and the rotation of the lever from a P position to a stow position may be enabled or prevented as necessary. Thus, the lever may be prevented in advance from unintentionally rotating from the P position to the stow position due to driver's inadvertent operation, and as a result, the risk of an accident that may be caused by the inadvertent operation may be reduced.

Other features and embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
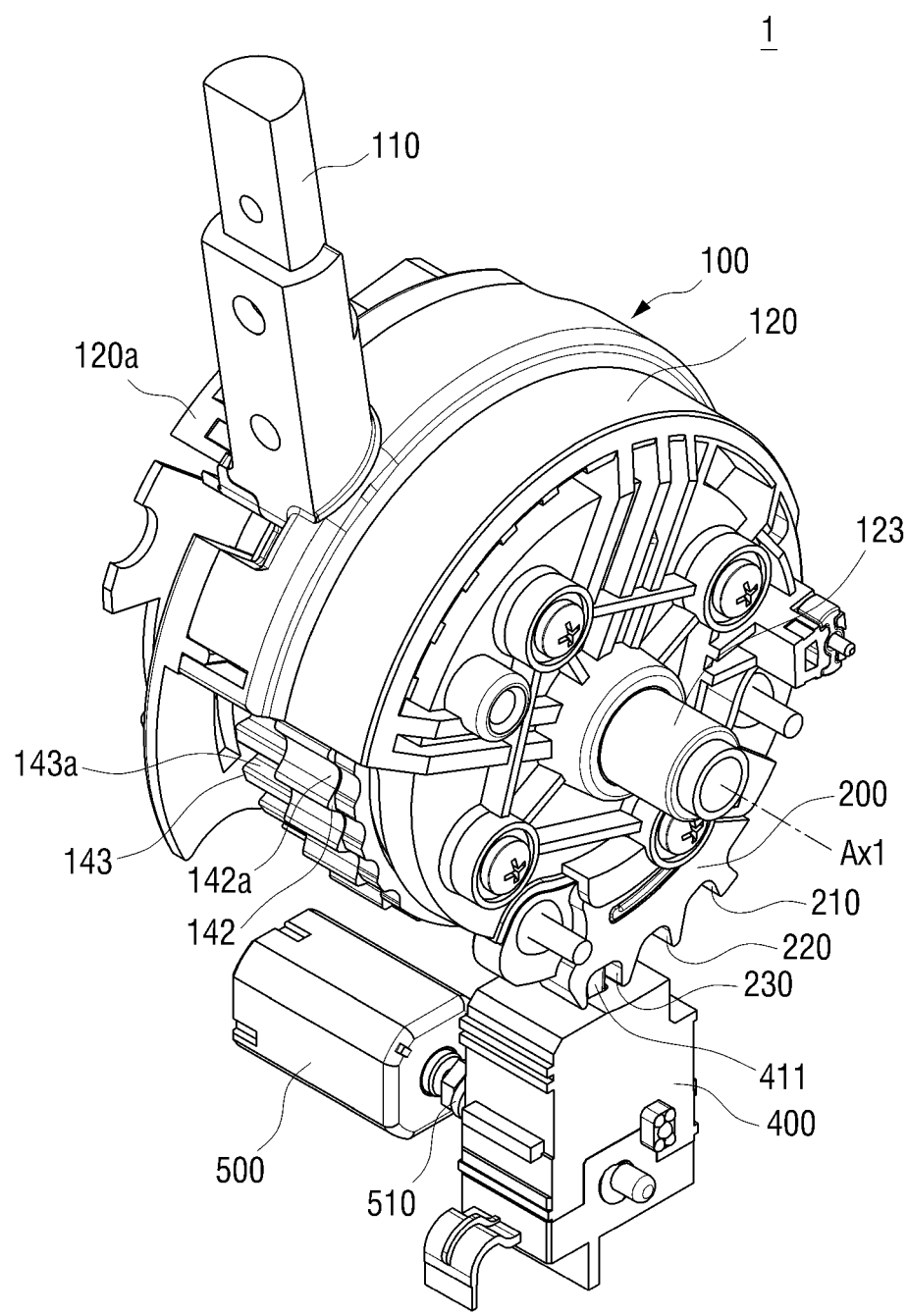
FIGS. 1 and 2 are perspective views of an automotive transmission according to an exemplary embodiment of the present disclosure.

The aspects and features of the present disclosure and methods for achieving the aspects and features will be apparent by referring to exemplary embodiments to be described in detail with reference to the accompanying drawings. However, the present disclosure is not limited to the exemplary embodiments disclosed hereinafter, but can be implemented in diverse forms. The matters defined in the description, such as the detailed construction and elements, are nothing but specific details provided to assist those of ordinary skill in the art in a comprehensive understanding of the invention, and the present disclosure is only defined within the scope of the appended claims. In the entire description of the present disclosure, the same drawing reference numerals are used for the same elements across various figures. Accordingly, in some exemplary embodiments, well-known processes, structures, and technologies may not be described in detail to avoid obscuring the invention in unnecessary detail.

In the following description of the present disclosure, the terms used are for explaining exemplary embodiments of the present disclosure, but do not limit the scope of the present disclosure. In the description, a singular expression may include a plural expression unless specifically described. The term "comprises" and/or "comprising" used in the description means that one or more other components, steps, operation and/or existence or addition of elements are not excluded in addition to the described components, steps, operation and/or elements. Further, the term "and/or" includes each of mentioned items and all combinations of one or more of the items.

In the following description of the present disclosure, exemplary embodiments of the present disclosure will be described with reference to plane views and sectional views which are ideal schematic views. The form of exemplary views may be modified due to the manufacturing techniques and/or allowable tolerances. Accordingly, the embodiments of the present disclosure are not limited to their specified form as illustrated, but include changes in form being produced according to manufacturing processes. In the drawings, sizes and relative sizes of layers and areas may be exaggerated for clarity in explanation. In the entire description of the present disclosure, the same drawing reference numerals are used for the same elements across various figures. Like reference numerals indicate like elements throughout the entire disclosure.

An automotive transmission according to an exemplary embodiment of the present disclosure will hereinafter be described with reference to the accompanying drawings.

Figure 2:
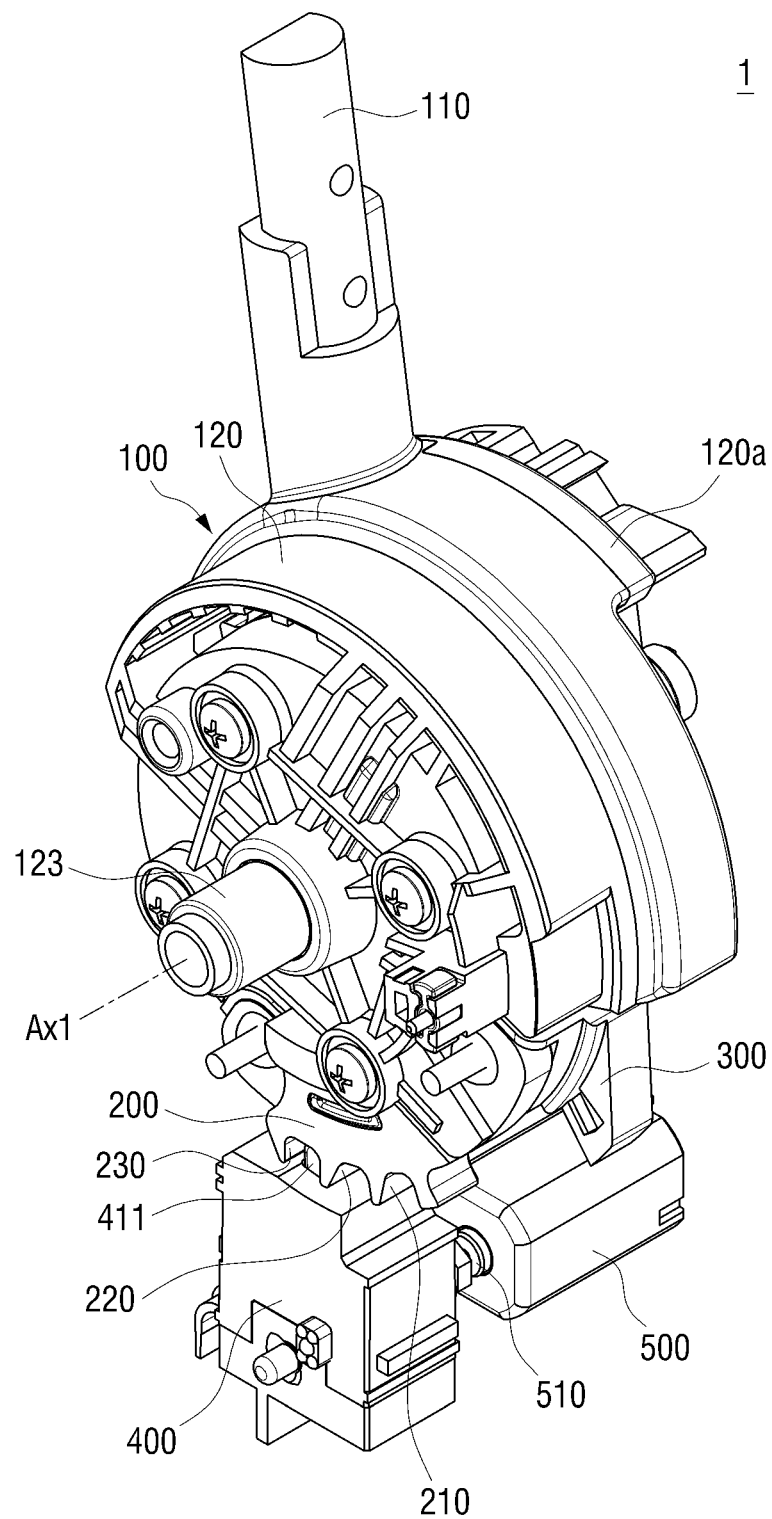
Figure 3:
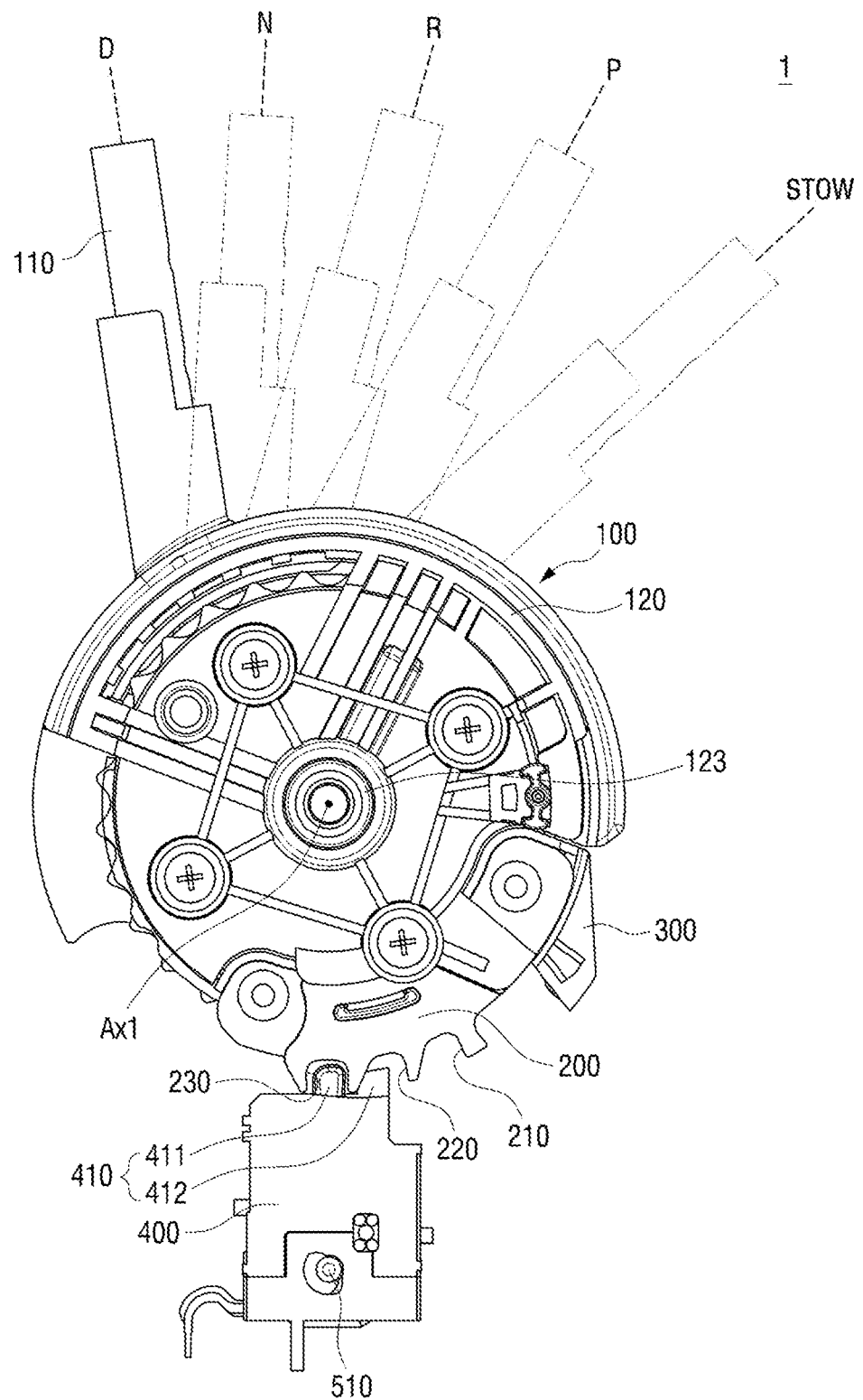
FIG. 3 is a side view of the automotive transmission according to an exemplary embodiment of the present disclosure.
Figure 4:
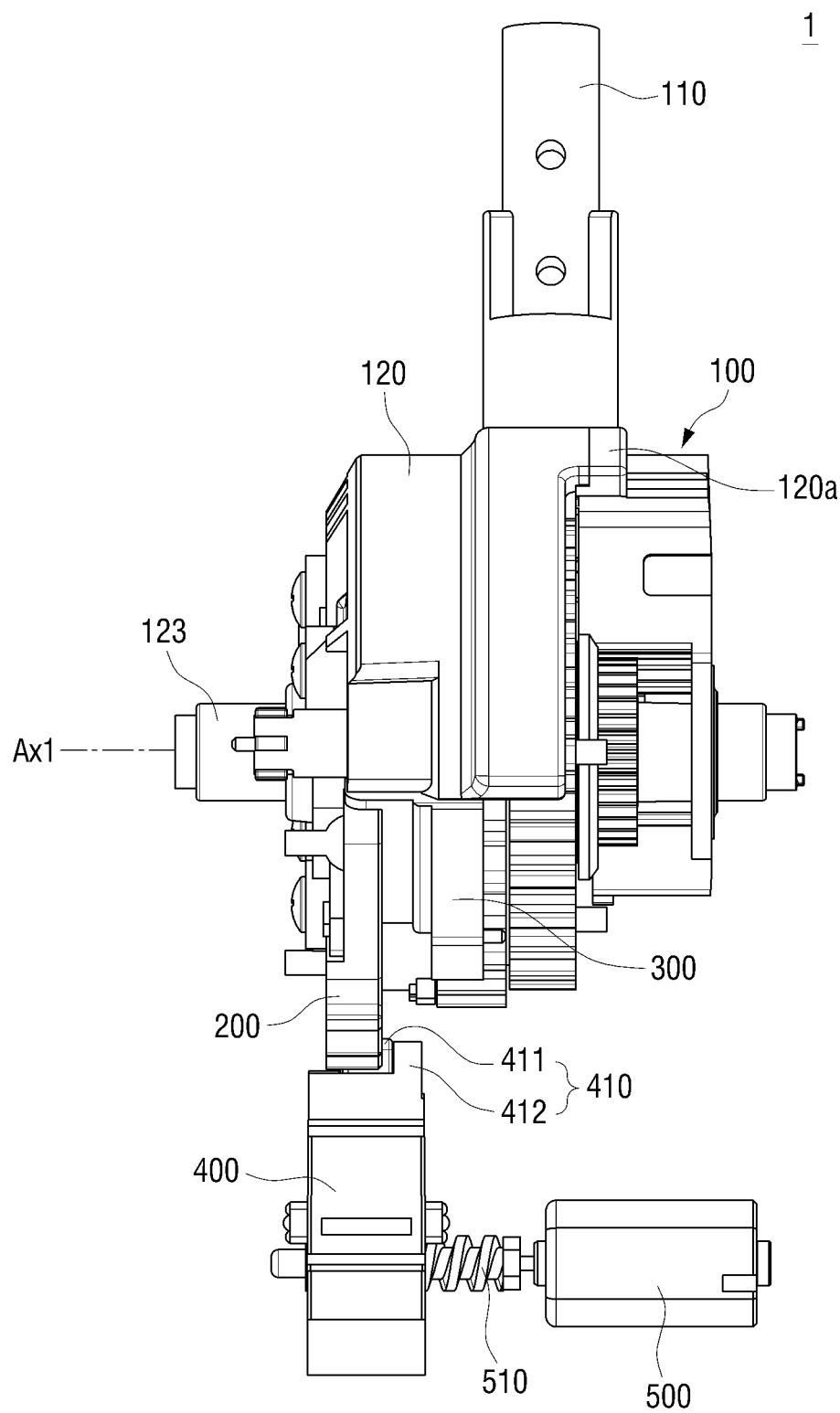
FIG. 4 is a front view of the automotive transmission according to an exemplary embodiment of the present disclosure.
Figure 5:
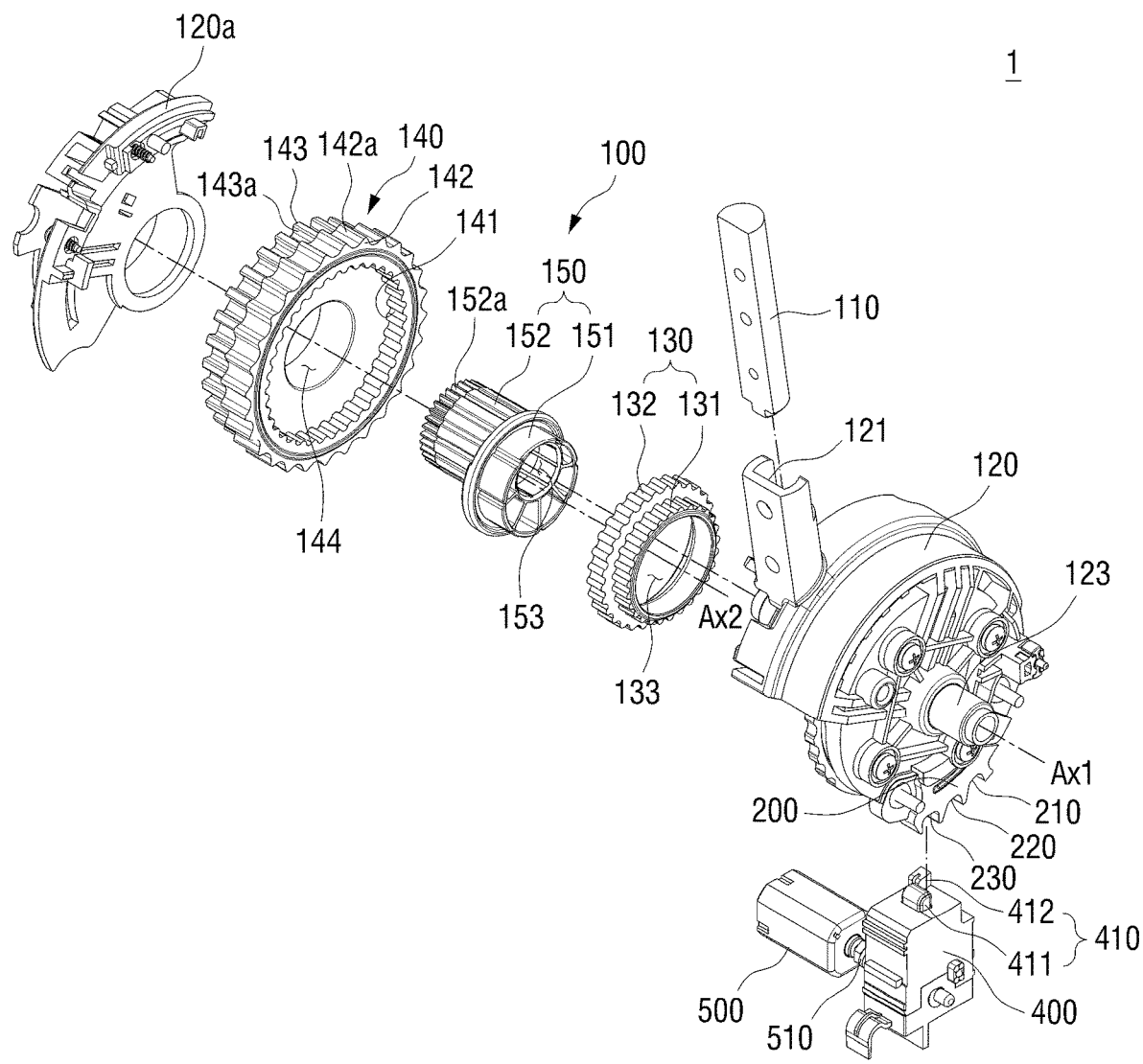
FIGS. 5 and 6 are exploded perspective views of the automotive transmission according to an exemplary embodiment of the present disclosure.
Figure 6:
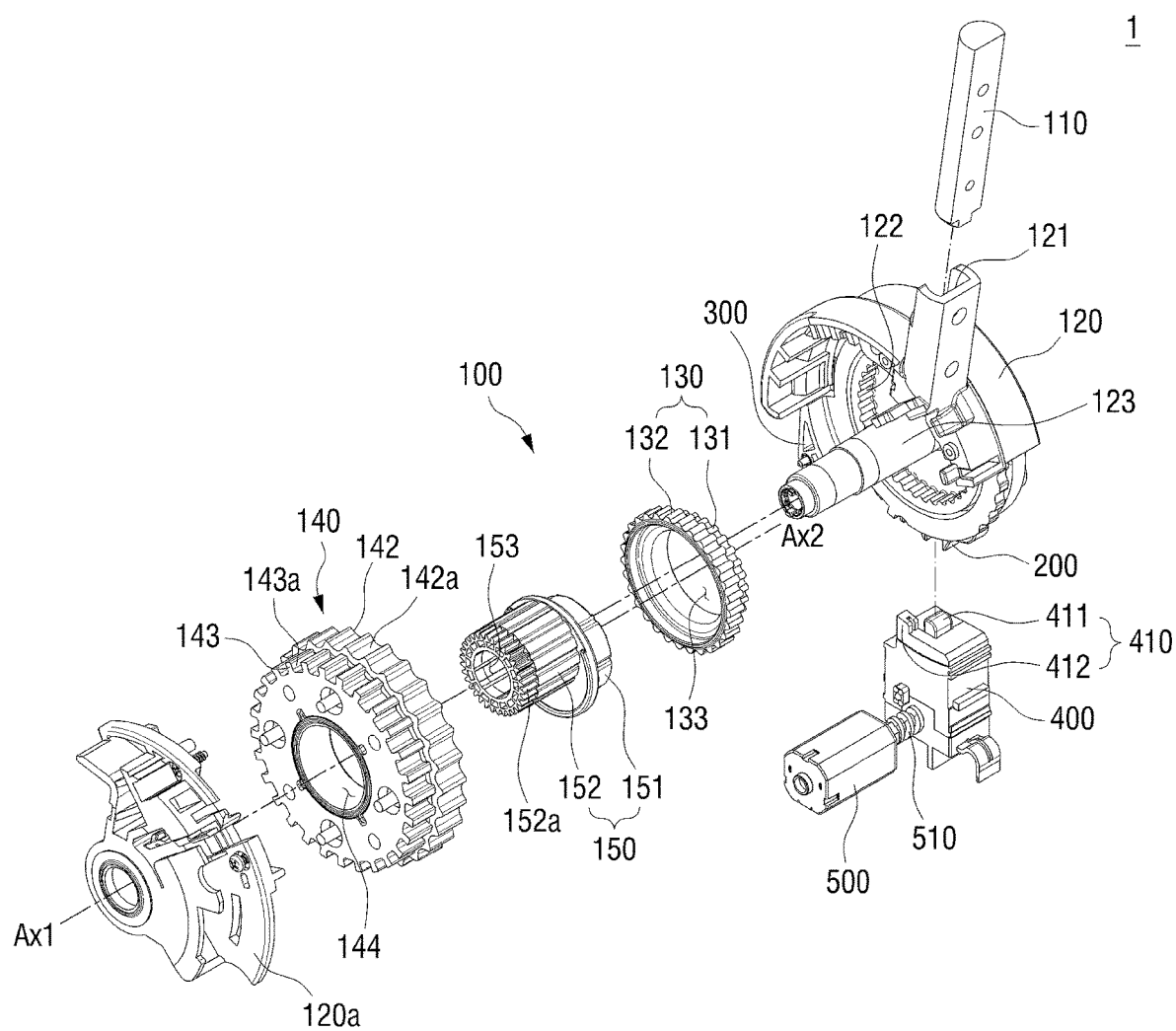

FIGS. 1 and 2 are perspective views of an automotive transmission according to an exemplary embodiment of the present disclosure, FIG. 3 is a side view of the automotive transmission according to an exemplary embodiment of the present disclosure, FIG. 4 is a front view of the automotive transmission according to an exemplary embodiment of the present disclosure, and FIGS. 5 and 6 are exploded perspective views of the automotive transmission according to an exemplary embodiment of the present disclosure. Referring to FIGS. 1 through 6, an automotive transmission 1 may include a lever assembly 100, a plurality of locking parts 200 and 300, a moving part 400, and a driving part 500.

The automotive transmission 1 will hereinafter be described as being installed between, for example, the center fascia and the console box of a vehicle, but the present disclosure is not limited thereto. The automotive transmission 1 may be installed at various other locations that may be easily accessed by the driver of the vehicle.

The lever assembly 100 may allow one of a plurality of gear stages to be selected in response to the driver's shift operation. Gear stages that may be selected in response to the driver's shift operation may include, for example, the Park (P) position, the Reverse (R) position, the Neutral (N) position, and the Drive (D) position, but the present disclosure is not limited thereto. The gear stages that may be selected in response to the driver's shift operation may vary, and some of the P, R, N, and D positions may also be selected by manipulation of additional buttons or switches.

The lever assembly 100 may include a lever 110, a movable part 120, an eccentric gear part 130, a rotary part 140, and an insertion part 150. The lever 110 may rotate between a plurality of positions about a rotational axis Ax1 to select one of the plurality of gear stages. The lever 110 will hereinafter be described as being, for example, a joystick type that rotates about the rotational axis Ax1, which is perpendicular to the longitudinal direction of the lever 110, to select one of the plurality of gear stages in response to the driver moving the lever 110 in the front-to-rear direction of the vehicle, but the present disclosure is not limited thereto. The present disclosure may also apply similarly to a rotary-type lever that rotates about its longitudinal direction to select one of the plurality of gear stages.

The lever 110 will hereinafter be described, assuming that the lever 110 rotates between the P, R, N, and D positions and a stow position in which the lever 110 is stowed in a predetermined storage space and that gears are shifted in the order of the P, R, N, and D positions or in the reverse order thereof. However, the order in which gears are shifted may vary depending on the gear stages that may be selected by the lever 110.

The stow position, which is a position where the lever 110 is stowed in a predetermined storage space to prevent the lever 110 from protruding to the inside of the vehicle while not actually performing gear shifting, may be understood as a securing space in the vehicle by stowing the lever 110 in the predetermined storage space when the shift of gears by the lever 110 is not necessary, for example, when the driving of the vehicle is complete (e.g., when the ignition of the vehicle is turned off).

Since the lever 110 may rotate to the stow position when the shift of gears is not necessary, i.e., when the vehicle is not operated, the lever 110 may rotate from the P position where the vehicle cannot be driven to the stow position. When the lever 110 is in the stow position, the P position may be maintained, and when the lever 110 is stowed in the predetermined storage space, the lever 110 may be driven by the driver or an additional driving device to rotate to the P position and may thus allow the driver to shift gears. For example, when the ignition of the vehicle is turned on, the lever 110 may rotate from the stow position to the P position. The rotation of the lever 110 from the stow position to the P position in response to starting the vehicle would not only allow the driver to shift gears, but also provide a "welcome" function that may accentuate the communication between the vehicle and the driver by providing an impression of welcoming the driver when the driver boards the vehicle.

The movable part 120 may be coupled to the lever 110 and may rotate integrally with the lever 110 about the rotational axis Ax1 of the lever 110 to allow one of the plurality of gear stages to be selected. That the movable part 120 rotates integrally with the lever 110 may encompass forming the movable part 120 and the lever 110 integrally, or forming the movable part 120 and the lever 110 separately and subsequently coupling them together later, such that the movable part 120 and the lever 110 may rotate together with no relative movement therebetween.

The movable part 120 may include an engaging groove 121 into which one end of the lever 110 may be inserted and coupled. The movable part 120 may be disposed on one side of the lever assembly 100 in the direction of the rotational axis Ax1 of the lever 110, and may be coupled to a cover 120a which is disposed on the other side of the lever assembly 100. However, the cover 120a, which is for aligning or protecting various elements of the lever assembly 100, including the movable part 120, may be omitted if such functions may be provided by the movable part 120.

The movable part 120 may include a first internal gear 122 which rotates about the rotational axis Ax1 of the lever 110 and a movable shaft 123 which extends from the center of the first internal gear 122 in the direction of the rotational axis Ax1 of the lever 110. The first internal gear 122 may be eccentrically engaged with the eccentric gear part 130 for allowing the eccentric gear part 130 to rotate and revolve simultaneously within the first internal gear 122, and this will be described later in detail. The movable shaft 123 is integrally formed with the first internal gear 122 and rotates together with the first internal gear 122 about the rotational axis Ax1 of the lever 110.

A sensing part (not illustrated) may be disposed at an end of the movable shaft 123 to receive the rotational force (e.g., torque) of the movable part 120 and to detect the position of the movable part 120. Since the movable part 120 rotates integrally with the lever 110, the position of the lever 110 may be defined by the position of the movable part 120. For example, the sensing part may detect the position of the movable part 120 by detecting, via a Hall sensor or the like, a magnetic force variation caused by a change of the location of a magnet gear (not illustrated) that is gear-engaged with the end of the movable shaft 123, and the position detected by the sensing part may be used to determine a gear stage selected by the lever 110. The sensing part may determine the position of the movable part 120 by detecting a magnetic force variation caused by a change of the position of the magnet gear, but the present disclosure is not limited thereto. Alternatively, the sensing part may determine the position of the movable part 120 by detecting the direction or angle of rotation of the movable part 120 in a contact- or non-contact manner using a mechanical, electric, magnetic, or optical sensor.

The eccentric gear part 130 may include a first external gear 131 which is eccentrically engaged with the first internal gear 122 and a second external gear 132. The second external gear 132 may share the same central axis (Ax2) as the first external gear 131 and may be integrally formed with the first external gear 131. That the first and second external gears 131 and 132 are integrally formed may encompass forming the first and second external gears 131 and 132 integrally, or forming the first and second external gears 131 and 132 separately and coupling them together later, such that there is no relative movement between the first and second external gears 131 and 132.

The eccentric gear part 130 may include a hollow 133, through which the end of the movable shaft 123 of the movable part 120 is inserted and penetrates, and as the end of the movable shaft 123 is inserted into the hollow 133 of the eccentric gear part 130, the first external gear 131 may be disposed to be eccentrically engaged with the first internal gear 122.

Figure 7:
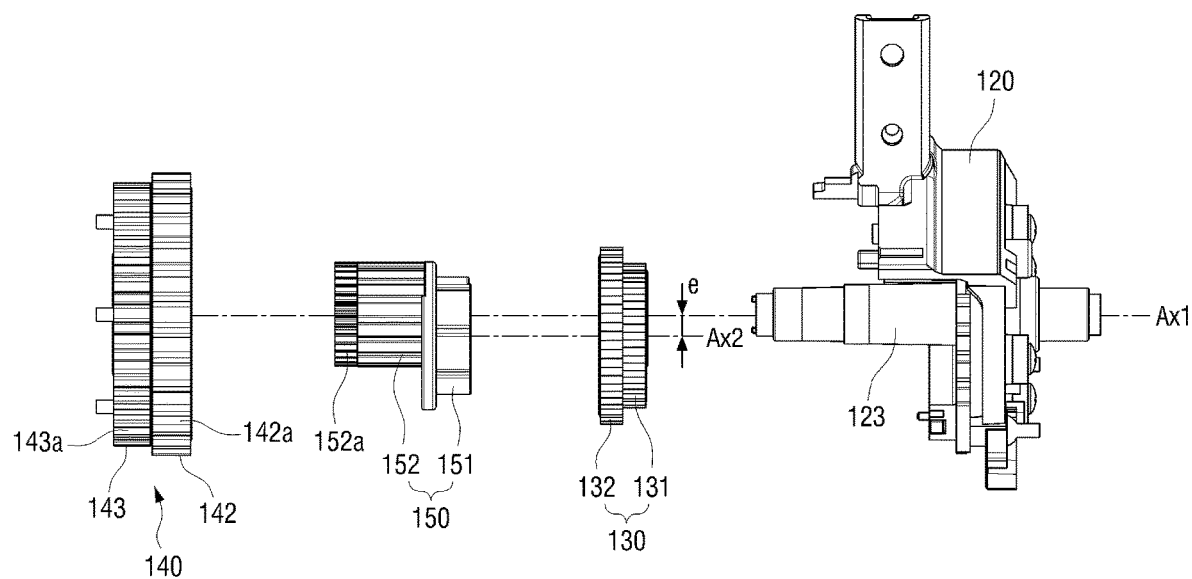
FIG. 7 is a schematic view illustrating the center axis of an eccentric gear part eccentric to the rotational axis of a lever according to an exemplary embodiment of the present disclosure.

Referring to FIG. 7, the first and second external gears 131 and 132 may be centered on the central axis Ax2, which is eccentric by a predetermined amount e with respect to the rotational axis Ax1 of the lever 110, and the amount e may vary depending on the design goals of the automotive transmission 1 such as reduction gear ratio. The first external gear 131 may be smaller in size (or diameter), and may have fewer gear teeth, than the first internal gear 122, and may perform an eccentric rotary motion by rotating in the first internal gear 122 about the central axis Ax2, and at the same time, revolving around the rotational axis Ax1 of the lever 110 such that the central axis Ax2 draws a circle around the rotational axis Ax1 of the lever 110. When the first external gear 131 performs an eccentric rotary function, the central axis Ax2, which is the center of both the first and second external gears 131 and 132, is not fixed, but revolves to draw a circle around the rotational axis Ax1 of the lever 110. Thus, the first external gear 131 may be understood as rotating about the central axis Ax2 that revolves around the rotational axis Ax1 of the lever 110.

When the movable part 120 rotates, the rotary part 140 may rotate together with the movable part 120 or may be fixed not to rotate, and the rotation of the rotary part 140 may be determined based on a source that generates a driving force for rotating the movable part 120.

The rotary part 140 may include a second internal gear 141, a detent portion 142, and a fixing portion 143. The second external gear 132 may be eccentrically engaged with the second internal gear 141, and a hollow 144 may be formed in the rotary part 140 and may be penetrated by the end of the movable shaft 123 of the movable part 120 to eccentrically engage the first and second external gears 131 and 132 with the first and second internal gears 122 and 141, respectively.

Similarly to the first external gear 131, the second external gear 132 may be smaller in size (or diameter), and may have fewer gear teeth, than the second internal gear 141, and may perform an eccentric rotary motion by rotating within the second internal gear 141 about the central axis Ax2, and at the same time, revolving around the rotational axis Ax1 of the lever 110 such that the central axis Ax2 draws a circle around the rotational axis Ax1 of the lever 110.

The detent portion 142 may provide the driver with an operating feel (e.g., tactile feedback or haptic response) during the rotation of the rotary part 140 and may include a plurality of detent grooves 142a which are formed along the outer periphery of the second internal gear 141. At least one bullet (not illustrated) which is elastically supported by an elastic body such as a spring may be disposed on one side of the rotary part 140 and may maintain to be in contact with the detent grooves 142a due to the elastic body. Thus, during the rotation of the rotary part 140, the at least one bullet may continue to move from one detent groove 142a to another detent groove 142a, thereby creating the operating feel.

The detent portion 142 may be formed along, for example, the outer periphery of the second internal gear 141, but the present disclosure is not limited thereto. Alternatively, to reduce the space necessary for creating the operating feel for the driver, the detent portion 142 may be formed to have a smaller diameter than the first internal gear 141, in which case, the detent portion 142 may be disposed on one side of the second internal gear 141 in the direction of the rotational axis Ax1 of the lever 110.

The fixing portion 143 may either allow the rotary part 140 to rotate, or fix the rotary part 140 not to rotate, depending on the source that generates the driving force for rotating the rotary part 120. The fixing portion 143 may be disposed on one side of the first internal gear 141 in the direction of the rotational axis Ax1 of the lever 110 and may include a plurality of fixing grooves 143a which are formed to have a predetermined radius from the rotational axis Ax1 of the lever 110. When an insertion member (not illustrated) is inserted into one of the fixing grooves 143a, the rotary part 140 may not rotate, but may be fixed.

The insertion part 150 may include an eccentric shaft 151 which is inserted into the center of the eccentric gear part 130 and a central shaft 152 which is inserted into the center of the rotary part 140, and the eccentric shaft 151 and the central shaft 152 may be integrally formed in a direction parallel to the rotational axis Ax1 of the lever 110 or to the central axis Ax2 of the eccentric gear part 130.

A hollow 153 may be formed in the insertion part 150 and may be penetrated by the end of the movable shaft 123. As a result, the eccentric shaft 151 may be inserted into the hollow 133 of the eccentric gear part 130, the central shaft 152 may be inserted into the hollow 144 of the rotary part 140, and at the same time, the end of the movable shaft 123 may be coupled to the sensing part through the hollow 153 of the insertion part 150.

A driving gear 152a for receiving a driving force for returning the lever 110 to a predetermined position may be formed at an end of the central shaft 152. In a case where a driving force is transmitted through the driving gear 152a, the central shaft 152 may rotate about the rotational axis Ax1 of the lever 110 to allow the eccentric gear part 130 to perform an eccentric rotary motion. In other words, the center of the eccentric shaft 151 and the center of the central shaft 152 may be eccentric to each other. Thus, when a driving force is transmitted to the driving gear 152a so that as the center shaft 152 rotates about the rotational axis Ax1 of the lever 110, the eccentric gear portion 130 may perform an eccentric rotary motion by rotating about the central axis Ax2, and at the same time, revolving around the rotational axis Ax1 of the lever 110 so as for the central axis Ax2 to form a circle around the rotational axis Ax1 of the lever 110.

When a driving force is transmitted to the driving gear 152a of the central shaft 152, the movable part 120, i.e., the lever 110, may return to the P position, but the present disclosure is not limited thereto. When a driving force is transmitted to the driving gear 152a of the central shaft 152, the lever 110 may return to any one of the plurality of gear stages. That the lever 110 returns to a particular position means that the lever 110 rotates from its current position to another position, and may encompass all cases where the lever 110 rotates from its current position to any one of the plurality of positions.

When the movable part 120 rotates due to a driving force generated by the driver's manipulation, the insertion part 150 may be fixed not to rotate. On the other hand, when a driving force is transmitted through the driving gear 152a, the insertion part 150 may allow the eccentric gear part 130 to perform an eccentric rotary motion and may thus enable the movable part 100 to rotate at a particular reduction gear ratio.

When the driving force for rotating the movable part 120 is generated by the driver's manipulation, the rotary part 140 may rotate to allow the driver to recognize a shift operation being performed. On the other hand, when the lever 110 is returned to a predetermined position in response to, for example, the ignition of the vehicle being turned off or an additional command being received, the rotary part 140 may be fixed by the fixing portion 143 not to rotate, and may thus prevent an operating feel from being created unnecessarily. In this manner, noise and wear may be reduced.

Referring again to FIGS. 1 through 6, the locking parts 200 and 300 may either allow the lever 110 to rotate from one position to another position or fix the lever 110 not to rotate. That the locking parts 200 and 300 fix the lever 110 not to rotate may encompass a case where the lever 110 is locked not to rotate in at least one of two directions about the rotational axis Ax1, as will hereinafter be described.

The locking parts 200 and 300 may include a first locking part 200 and a second locking part 300, and the first and second locking parts 200 and 300 may be disposed at different locations in the direction of the rotational axis Ax1 of the lever 110 to be spaced apart from each other by a predetermined distance in the direction of rotation of the lever 110. That the first and second locking parts 200 and 300 are disposed at different locations in the direction of the rotational axis Ax1 of the lever 110 to be spaced apart from each other by a predetermined distance in the direction of rotation of the lever 110 is not only for non-rotatably fixing the lever 110 with each of the first and second locking parts 200 and 300, but also for non-rotatably fixing the lever 110 even with the portion between the first and second locking parts 200 and 300.

The first locking part 200 may fix the lever 110 not to rotate from positions that correspond to the plurality of gear stages, i.e., the P, R, N, and D positions. The first locking part 200 may include a plurality of insertion grooves 210, 220, and 230 which are formed along the direction of rotation of the lever 110, and the insertion grooves 210, 220, and 230 may be formed to correspond to the R, N, and D positions, respectively, and may allow the lever 110 to rotate only if shift conditions such as the speed of the vehicle in each gear stage, the presence of brake pedal manipulation, and the like are met. An end of the first locking part 200 adjacent to the second locking part 300 may be formed to correspond to the P position and may allow the lever 110 to rotate to the R position only if the shift conditions are met. The end of the first locking part 200 may be fixed not to rotate from the P position to the R position since gears may be shifted in the order of the P, R, N, and D positions or in the reverse order thereof.

FIGS. 3 and 4 illustrate a case where the lever 110 is in the D position and a locking portion 410 of the moving part 400 is inserted in the insertion groove 230 that correspond to the D position to fix the lever 110 not to rotate. A case where the lever 110 becomes rotatable or non-rotatably fixed by the moving part 400 will be described later.

The second locking part 300 may either allow the lever 110 to rotate from the P position to the stow position or fix the lever 110 not to rotate. In other words, when the lever 110 is rotatable from the P position to the stow position, the shift of gears is not needed due to, for example, the ignition of the vehicle being turned off. Thus, when the ignition of the vehicle is off, the rotation of the lever 110 from the P position to the stow position is blocked by the second locking part 300. The moving part 400 may move in the direction of the rotational axis Ax1 of the lever 110, and as the moving part 400 moves, the locking portion 410, which is formed at one side of the moving part 400, may be placed on at least one of the paths of rotation of the first and second locking parts 200 and 300 to cause the lever 100 to become either movable or be fixed not to rotate.

Figure 8:
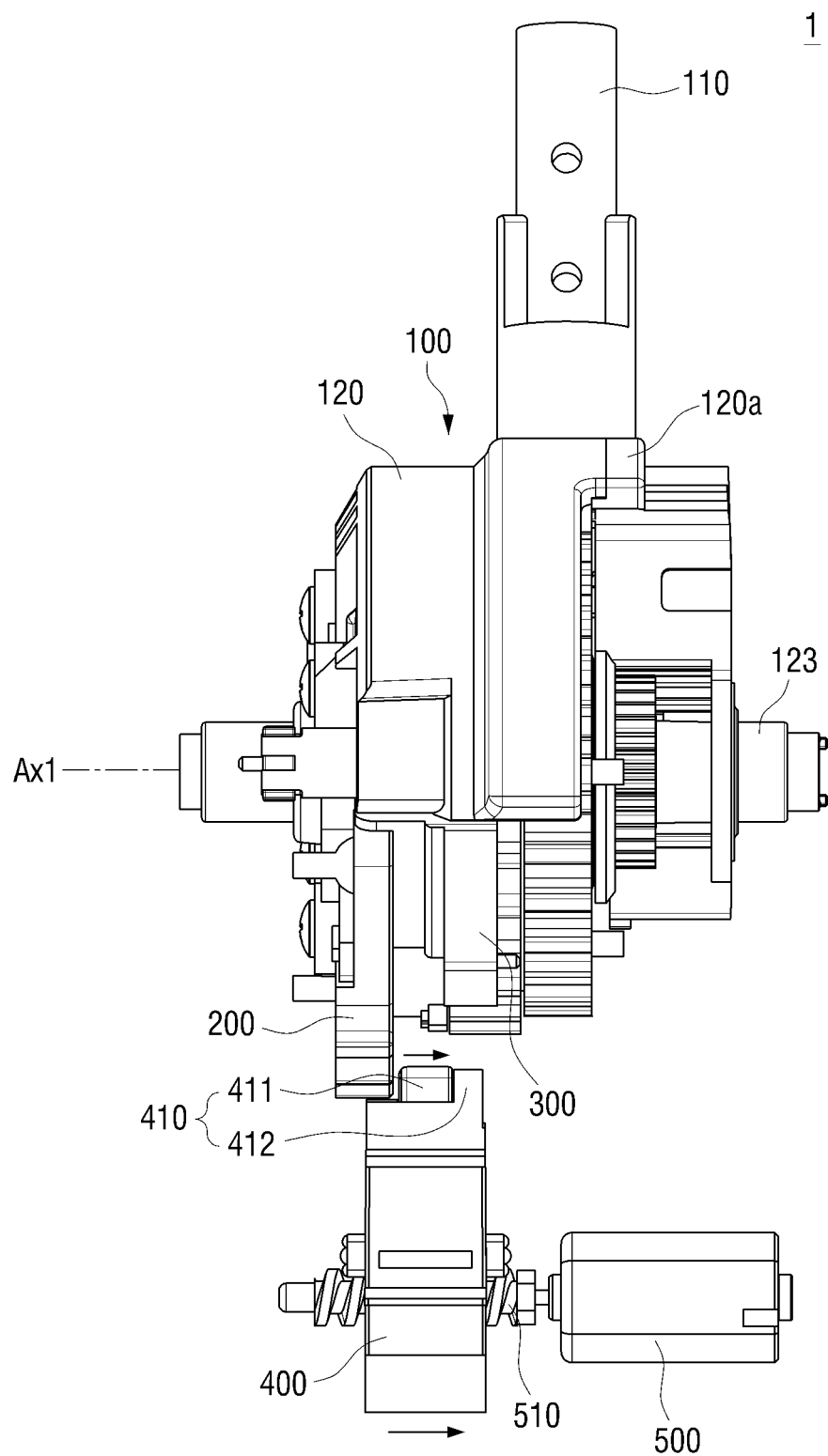
FIG. 8 is a front view illustrating the position of a moving part for enabling the lever according to an exemplary embodiment of the present disclosure to rotate between positions that correspond to a plurality of gear stages.

The locking portion 410 may move in the direction of the rotational axis Ax1 of the lever 110 to be either inserted into one of the insertion grooves 210, 220, and 230 of the first locking part 200 or detached from the insertion grooves 210, 220, and 230. Which of the insertion grooves 210, 220, and 230 the locking portion 410 is to be inserted into may vary depending on the position of the lever 110. In other words, the lever 110 may be understood as being in one of the R, N and D positions in order for the locking portion 410 to be inserted into one of the insertion grooves 210, 220, and 230, and in a case where the locking portion 410 is inserted into one of the insertion grooves 210, 220, and 230, as illustrated in FIGS. 3 and 4, the locking portion 410 may remain inserted, and as a result, the lever 110 may be fixed not to rotate from one of the R, N, and D positions to another position until the shift conditions are met. On the other hand, in a case where the locking portion 410 moves to be detached from the insertion grooves 210, 220, and 230, as illustrated in FIG. 8, the lever 110 may become rotatable. Specifically, referring to FIG. 8, the locking portion 410 deviates from the path of rotation of the first locking part 200 and is disposed on the path of rotation of the second locking part 300. In this case, due to the gap between the first and second locking parts 200 and 300, the locking portion 410 may be spaced apart from the second locking part 300, and as a result, the lever 110 may become rotatable.

Figure 9:
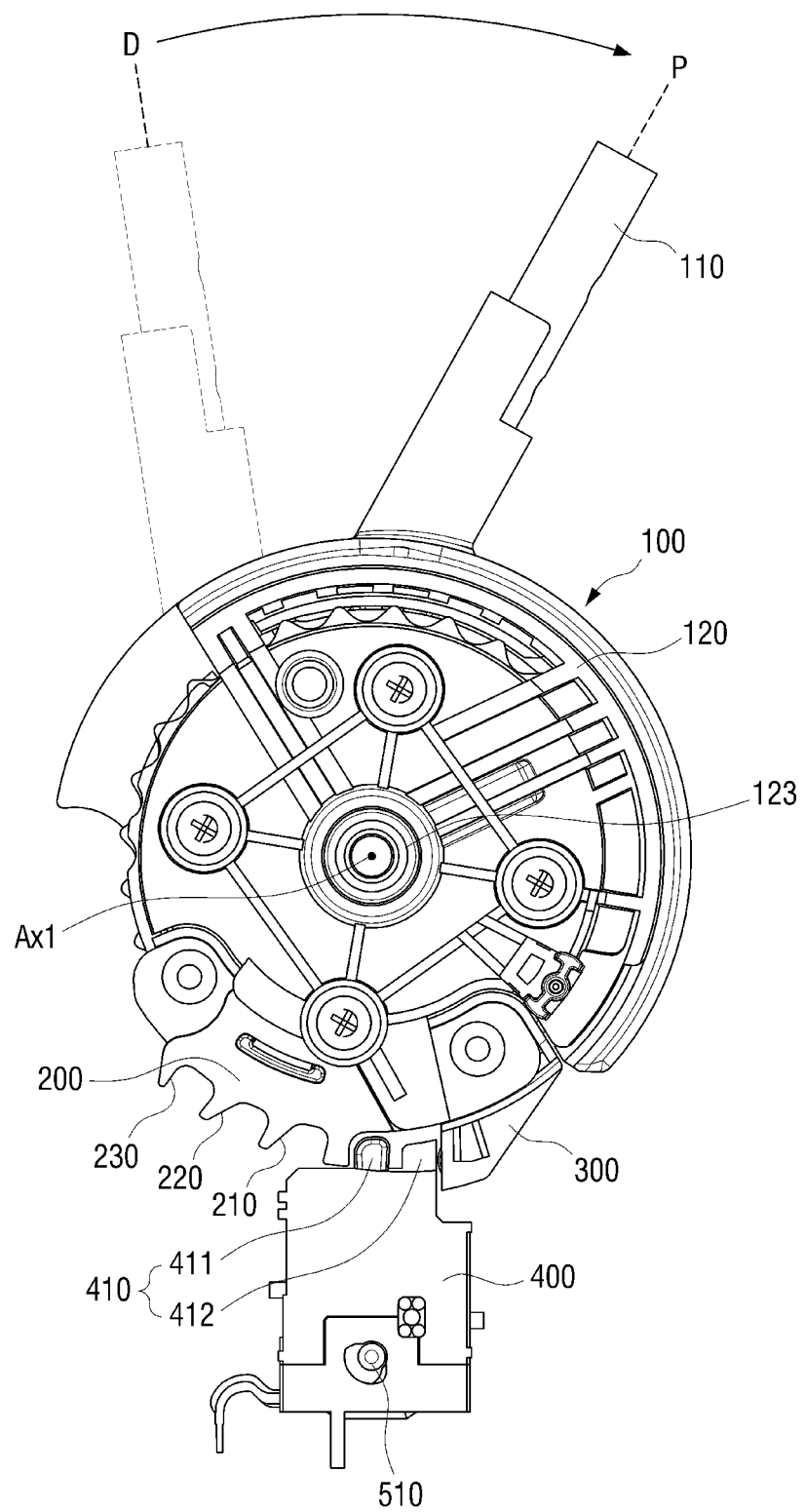
FIG. 9 is a side view illustrating the position of the moving part for blocking the rotation of the lever according to an exemplary embodiment of the present disclosure from the Park (P) position to a stow position.
Figure 10:
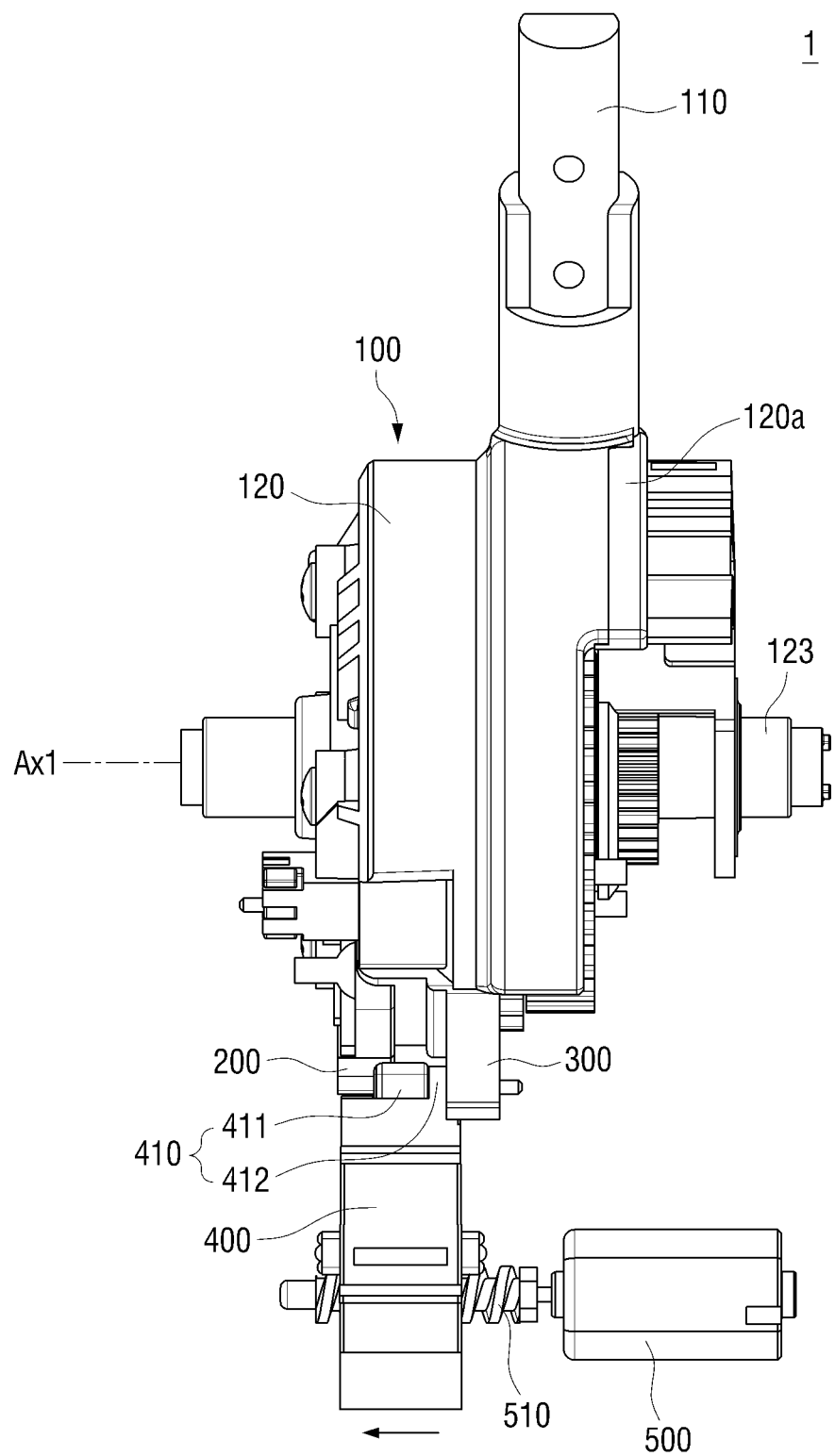
FIG. 10 is a front view illustrating the position of the moving part for blocking the rotation of the lever according to an exemplary embodiment of the present disclosure from the P position to the stow position.
Figure 11:
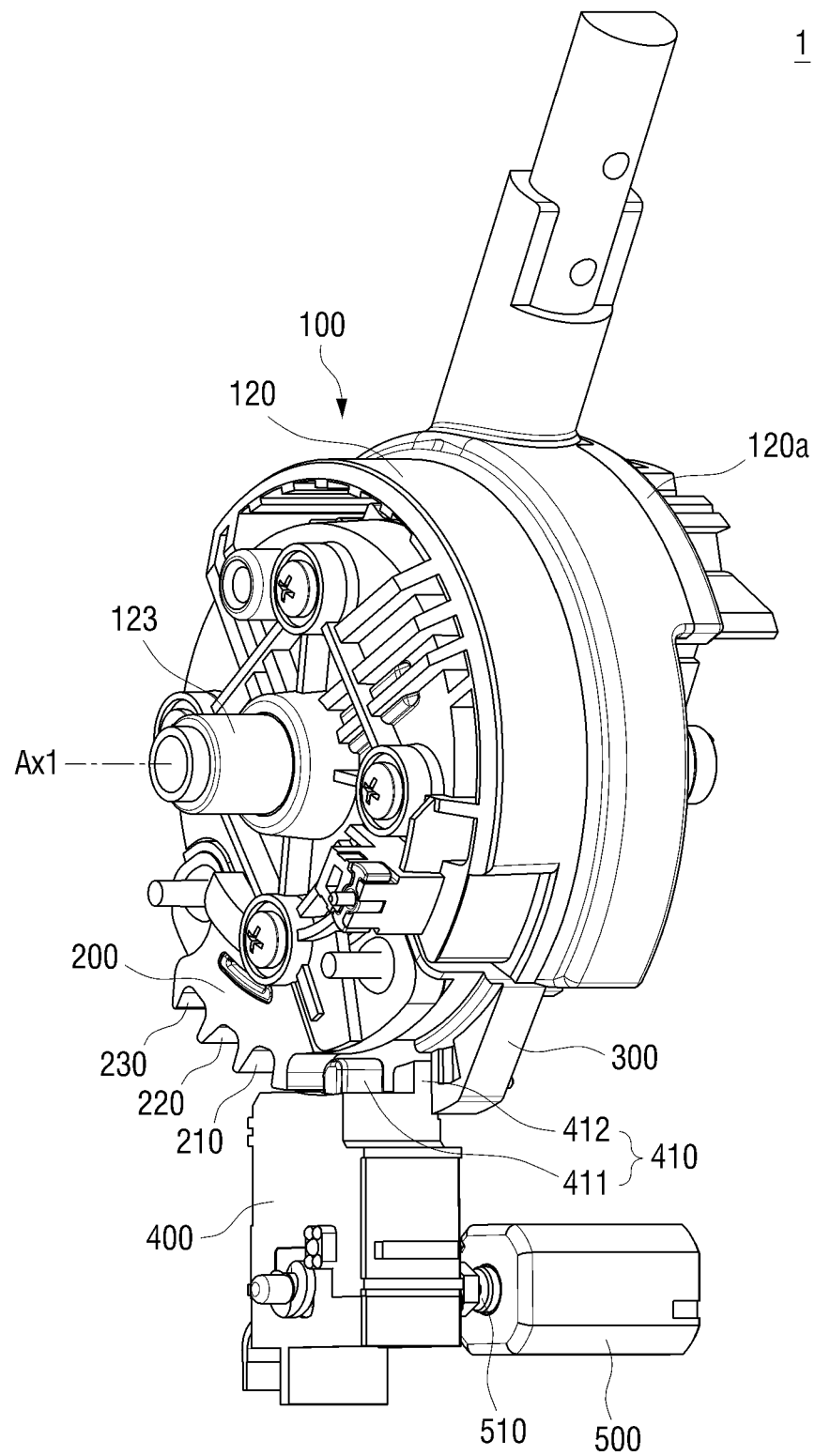
FIG. 11 is a perspective view illustrating the position of the moving part for blocking the rotation of the lever according to an exemplary embodiment of the present disclosure from the P position to the stow position.

In a case where after the rotation of the lever 110 to the P position, the moving part 400 moves so that the locking portion 410 is disposed to abut the end of the first locking part 200 adjacent to the second locking part 300, the rotation of the lever 110 from the P position to the R, N, and D positions may be blocked, and at the same time, the locking portion 410 may be disposed to abut an end of the second locking part 300 adjacent to the first locking part 200 and may thus block the rotation of the lever 110 to the stow position. In other words, in a case where the locking portion 410 is disposed to abut the end of the first locking part 200 adjacent to the second locking part 300 or with the end of the second locking part 300 adjacent to the first locking part 200, as illustrated in FIGS. 9 through 11, the rotation of the lever 110 not only to the R, N, and D positions, but also to the stow position, may be blocked.

Figure 12:
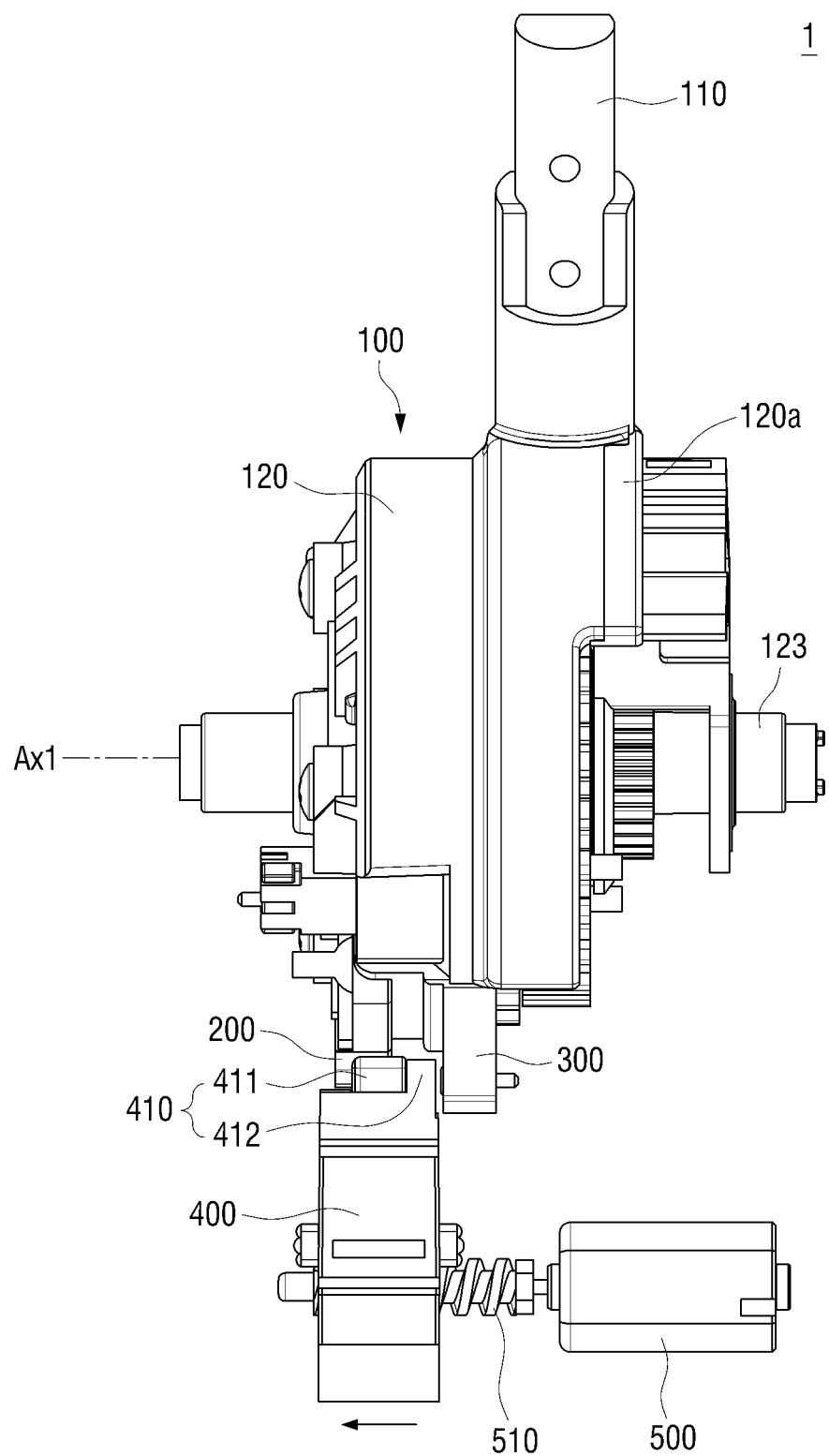
FIG. 12 is a front view illustrating the position of the moving part for enabling the rotation of the lever according to an exemplary embodiment of the present disclosure from the P position to the stow position.
Figure 13:
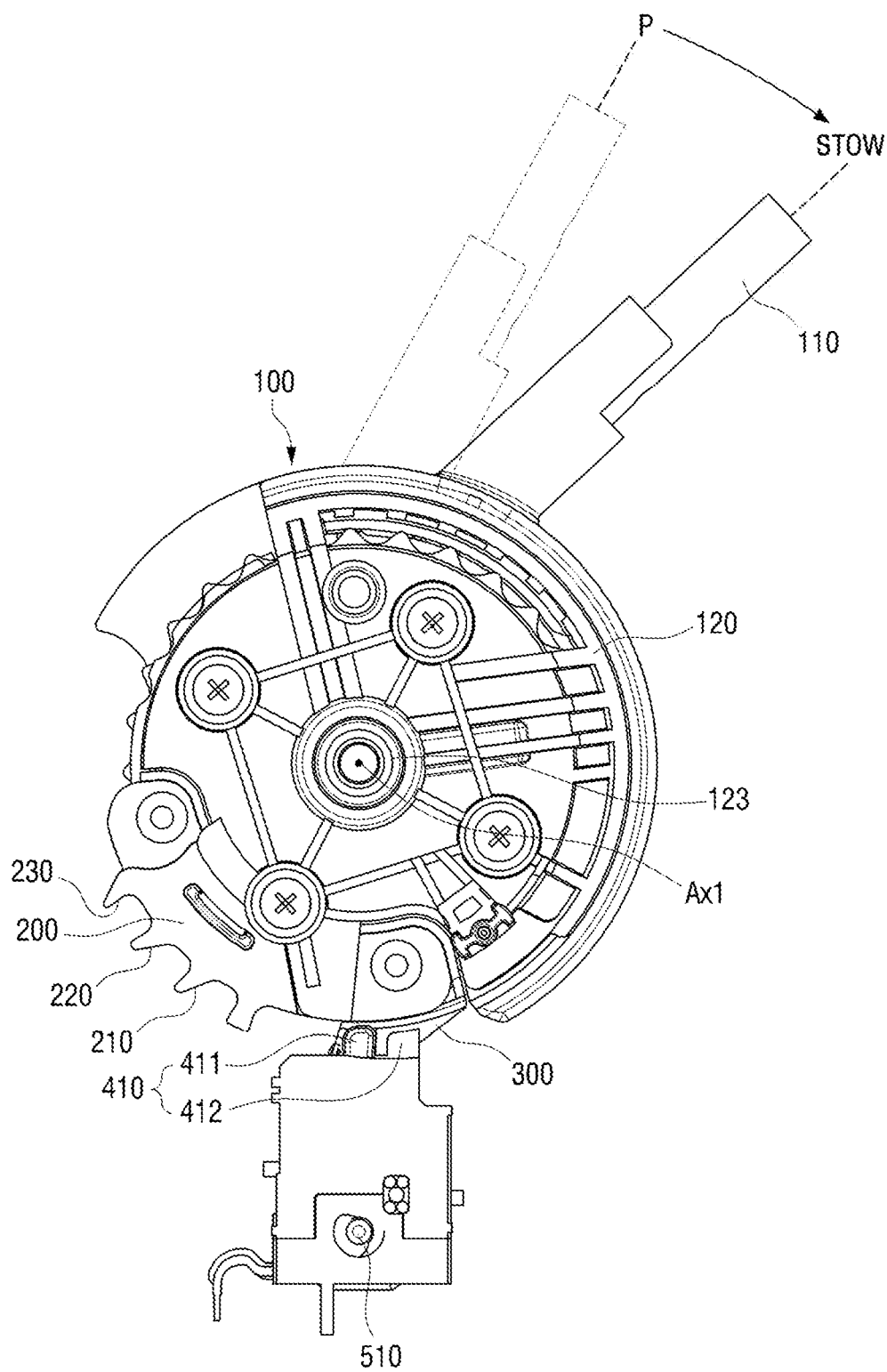
FIG. 13 is a side view of the lever according to an exemplary embodiment of the present disclosure as rotated from the P position to the stow position.

Since the first and second locking parts 200 and 300 are formed at different locations along the direction of the rotational axis Ax1 of the lever 110, the locking portion 410 may be formed to extend along the direction of the rotational axis Ax1 of the lever 110 to be able to be disposed to abut at least one of the ends of the first and second locking parts 200 and 300. In this case, when the moving part 400 moves toward the first locking part 200 in the direction of the rotational axis Ax1 of the lever 110, the locking portion 410 may deviate from the path of rotation of the second locking part 300, as illustrated in FIG. 12, and as a result, the lever 110 may become rotatable from the P position to the stow position and may then rotate to the stow position, as illustrated in FIG. 13.

The locking portion 410 may include first and second contact portions 411 and 412 which are in contact with the ends of the first and second locking parts 200 and 300, respectively, but the present disclosure is not limited thereto. Alternatively, the locking portion 410 may be formed to extend along the direction of the rotational axis Ax1 of the lever 110 and may thus be able to contact at least one of the ends of the first and second locking parts 200 and 300.

The driving part 500 may generate a driving force for moving the moving part 400 in consideration of the position of the lever 110 and shift conditions for the position of lever 110. The driving force generated by the driving part 500 may be transmitted to the moving part 400 via a transmitting gear 510, and the transmitting gear 510 may include a worm gear and may have a nut structure that may move in the direction of the rotational axis Ax1 of the lever depending on the direction of rotation of the worm gear. However, the present disclosure is not limited to this. Alternatively, the driving force generated by the driving part 600 may be transmitted to the moving part 400 via at least one transmitting member such as a gear or a link.

The automotive transmission 1 may either allow the lever 110 to rotate, or fix the lever 110 not to rotate, depending on the shift conditions when the lever 110 rotates between the positions that correspond to the plurality of gear stages, and also may allow or prevent the rotation of the lever 110 to the stow position. Thus, the possibility of an accident occurring due to the lever 110 unintentionally rotating from the P position to the stow position due to driver's inadvertent operation may be prevented in advance.

While exemplary embodiments of the present disclosure are described above, it is not intended that these exemplary embodiments describe all possible forms of the invention. Rather, the words used in the specification are words of description rather than limitation, and it is understood that various changes may be made without departing from the spirit and scope of the inventive concept of the present disclosure. Additionally, the features of various implementing embodiments may be combined to form further embodiments of the inventive concept of the present disclosure.

What is claimed is:

1. An automotive transmission shift apparatus comprising:
   a lever assembly including a lever which rotates between a plurality of positions about a rotational axis thereof to select one of a plurality of gear stages;
   a plurality of locking parts that rotate integrally with the lever and are disposed at different locations in a direction of the rotational axis of the lever to be spaced apart by a predetermined distance in a direction of rotation of the lever and thus to block the rotation of the lever in at least one direction about the rotational axis of the lever; and a moving part that moves in the direction of the rotational axis of the lever to allow one side thereof to be disposed on at least one of paths of rotation of the plurality of locking parts, wherein the plurality of locking parts comprises:

a first locking part that blocks the rotation of the lever from a position that corresponds to at least one of the plurality of gear stages; and a second locking part that blocks the rotation of the lever to a stow position in which the lever is stowed in a predetermined space, and wherein when one side of the moving part is disposed at an end of the first locking part adjacent to the second locking part, the rotation of the lever from a Park position to a non-Park position is blocked, and the rotation of the lever from the Park position to the stow position is allowed.

2. The automotive transmission shift apparatus of claim 1, wherein the first locking part includes a plurality of insertion grooves which are formed at positions that correspond to the plurality of gear stages, and blocks the rotation of the lever from a position that corresponds to one of the plurality of insertion grooves into which the one side of the moving part is inserted.

3. The automotive transmission shift apparatus of claim 2, wherein the plurality of insertion grooves block the rotation of the lever from a non-Park position among the plurality of positions.

4. The automotive transmission shift apparatus of claim 1, wherein when the one side of the moving part is disposed at an end of the first locking part adjacent to the second locking part and at an end of the second locking part adjacent to the first locking part, the rotation of the lever from a Park position to a non-Park position and the rotation of the lever from the Park position to the stow position is blocked.

5. The automotive transmission shift apparatus of claim 1, wherein the moving part includes a locking portion formed on the one side thereof, and wherein the locking portion is disposed on at least one of the paths of rotation of the plurality of locking parts.

6. The automotive transmission shift apparatus of claim 5, wherein the locking portion extends in the direction of the rotational axis of the lever.

7. The automotive transmission shift apparatus of claim 5, wherein the locking portion includes a plurality of contact portions which are formed at different locations in the direction of the rotational axis of the lever, and wherein each of the plurality of contact portions is disposed on at least one of the paths of rotation of the plurality of locking parts depending on a position of the lever.

8. The automotive transmission shift apparatus of claim 7, wherein the plurality of contact portions are formed to have therebetween a distance that corresponds to a distance between the plurality of locking parts.

* * * * *